(12) United States Patent
Breeden et al.

(10) Patent No.: US 8,960,706 B2
(45) Date of Patent: Feb. 24, 2015

(54) TOWING BALL MOUNT MERCHANDISING AND DISPLAYING ARRANGEMENT

(71) Applicant: TowSmart LLC, Cleveland, OH (US)

(72) Inventors: Winston Breeden, Chagrin Falls, OH (US); Thaddeus T. Brej, Rocky River, OH (US)

(73) Assignee: Winston Products LLC, Cleveland, OH (US)

( * ) Notice: Subject to any disclaimer, the term of this patent is extended or adjusted under 35 U.S.C. 154(b) by 48 days.

(21) Appl. No.: 13/769,555

(22) Filed: Feb. 18, 2013

(65) Prior Publication Data

US 2013/0161276 A1 Jun. 27, 2013

Related U.S. Application Data

(63) Continuation-in-part of application No. 12/949,184, filed on Nov. 18, 2010, now Pat. No. 8,376,151.

(60) Provisional application No. 61/262,279, filed on Nov. 18, 2009.

(51) Int. Cl.
*B60D 1/52* (2006.01)
*A47F 7/00* (2006.01)
*G09F 21/04* (2006.01)

(52) U.S. Cl.
CPC ... *A47F 7/00* (2013.01); *B60D 1/52* (2013.01); *G09F 21/04* (2013.01)
USPC ...................................................... 280/491.5

(58) Field of Classification Search
USPC ........................ 280/511, 491.5, 507
See application file for complete search history.

(56) References Cited

U.S. PATENT DOCUMENTS

| | | | | |
|---|---|---|---|---|
| 4,428,596 A * | 1/1984 | Bell et al. | ....................... | 280/507 |
| 6,733,029 B2 * | 5/2004 | McCoy et al. | ................ | 280/506 |
| 6,945,550 B2 * | 9/2005 | Williams | ....................... | 280/506 |
| 7,306,275 B2 * | 12/2007 | Kalous | .......................... | 296/1.07 |
| 7,568,718 B1 * | 8/2009 | Thomas | ....................... | 280/507 |
| 7,661,543 B1 * | 2/2010 | Townsend | ......................... | 211/4 |
| 7,878,526 B1 * | 2/2011 | Jantzen | ......................... | 280/515 |
| 7,889,062 B1 * | 2/2011 | Albisa | ............................ | 340/431 |
| 7,909,350 B1 * | 3/2011 | Landry | ........................ | 280/479.2 |
| 8,201,844 B1 * | 6/2012 | Smoot | .......................... | 280/491.5 |
| 8,641,076 B2 * | 2/2014 | Sparkes et al. | ................ | 280/480 |
| 2007/0007782 A1 * | 1/2007 | Kalous | ........................... | 296/1.07 |
| 2011/0193321 A1 * | 8/2011 | Breeden et al. | ................ | 280/511 |

* cited by examiner

*Primary Examiner* — Kevin Hurley
(74) *Attorney, Agent, or Firm* — Cooper Legal Group, LLC

(57) ABSTRACT

A towing ball mount merchandising and displaying arrangement. The arrangement includes a ball mount that includes a tongue portion having an aperture for receiving a securing portion of a hitch ball and that includes a mounting portion for insertion into a receiver located upon a vehicle. The mounting portion has an aperture there through for receiving a securing member to retain the mounting portion within the receiver located upon the vehicle. The arrangement includes a removable support member extending through the aperture of the mounting portion of the ball mount. The support member has portions that extend to protrude from each of two sides of the mounting portion. The portions of the support member that protrude provide contact areas for engagement with members of a merchandising display such that the ball mount is suspendable relative to the merchandising display upon the support member.

18 Claims, 4 Drawing Sheets

TOWING BALL MOUNT MERCHANDISING AND DISPLAYING ARRANGEMENT

RELATED APPLICATIONS

This application claims the benefit of U.S. patent application Ser. No. 12/949,184 filed on Nov. 18, 2010 and U.S. Provisional Patent Application No. 61/262,279 filed on Nov. 18, 2009, both entire disclosures of which are hereby incorporated herein by reference.

FIELD OF THE INVENTION

The present application relates to merchandising and displaying of a towing product. More particularly, the present application relates to a towing ball mount merchandising and displaying arrangement with a support member for merchandising and displaying of a ball mount towing product.

BACKGROUND OF THE INVENTION

Due to their steel construction, the typical components used for towing a trailer (ball mounts, hitch balls, couplers, etc) are very heavy and cumbersome. In a retail setting, this presents a unique problem for the "point of purchase" displaying and merchandising of these products. Conventionally, major retailers of this category currently merchandise towing products in a horizontally spread or spaced arrangement. Such horizontal presentation is typical for ball mounts.

It is also common for there to be many variations of each component used for towing, including ball mounts, offered for sale in the retail environment. It is difficult for these variations to be distinguished from one another since they all appear similar to the untrained eye and/or are disorganized. Furthermore, these many variations require a significant amount of the retail space for merchandising and displaying. The need for efficient use of the space has been recognized by the present inventive entity.

BRIEF SUMMARY OF THE INVENTION

The following presents a simplified brief description of the invention in order to provide a basic understanding of some example aspects of the invention. This brief description is not an extensive overview of the invention. Moreover, this brief description is not intended to identify critical elements of the invention nor delineate the scope of the invention. The sole purpose of the brief description is to present some concepts of the invention in simplified form as a prelude to the more detailed description that is presented later.

In accordance with one aspect, the invention provides a towing ball mount merchandising and displaying arrangement. The arrangement includes a ball mount that includes a tongue portion having an aperture for receiving a securing portion of a hitch ball and that includes a mounting portion for insertion into a receiver located upon a vehicle. The mounting portion has an aperture there through for receiving a securing member to retain the mounting portion within the receiver located upon the vehicle. The arrangement includes a removable support member extending through the aperture of the mounting portion of the ball mount. The support member has portions that extend to protrude from each of two sides of the mounting portion. The portions of the support member that protrude provide contact areas for engagement with members of a merchandising display such that the ball mount is suspendable relative to the merchandising display upon the support member.

In accordance with another aspect, the invention provides a merchandising display that includes a plurality of support members and at least one towing ball mount merchandising and displaying arrangement. The arrangement includes a ball mount that includes a tongue portion having an aperture for receiving a securing portion of a hitch ball and that includes a mounting portion for insertion into a receiver located upon a vehicle. The mounting portion has an aperture there through for receiving a securing member to retain the mounting portion within the receiver located upon the vehicle. The arrangement includes a removable support member extending through the aperture of the mounting portion of the ball mount. The support member has portions that extend to protrude from each of two sides of the mounting portion. The portions of the support member that protrude provide contact areas for engagement with the members such that the ball mount is suspended within the merchandising display upon the support member.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
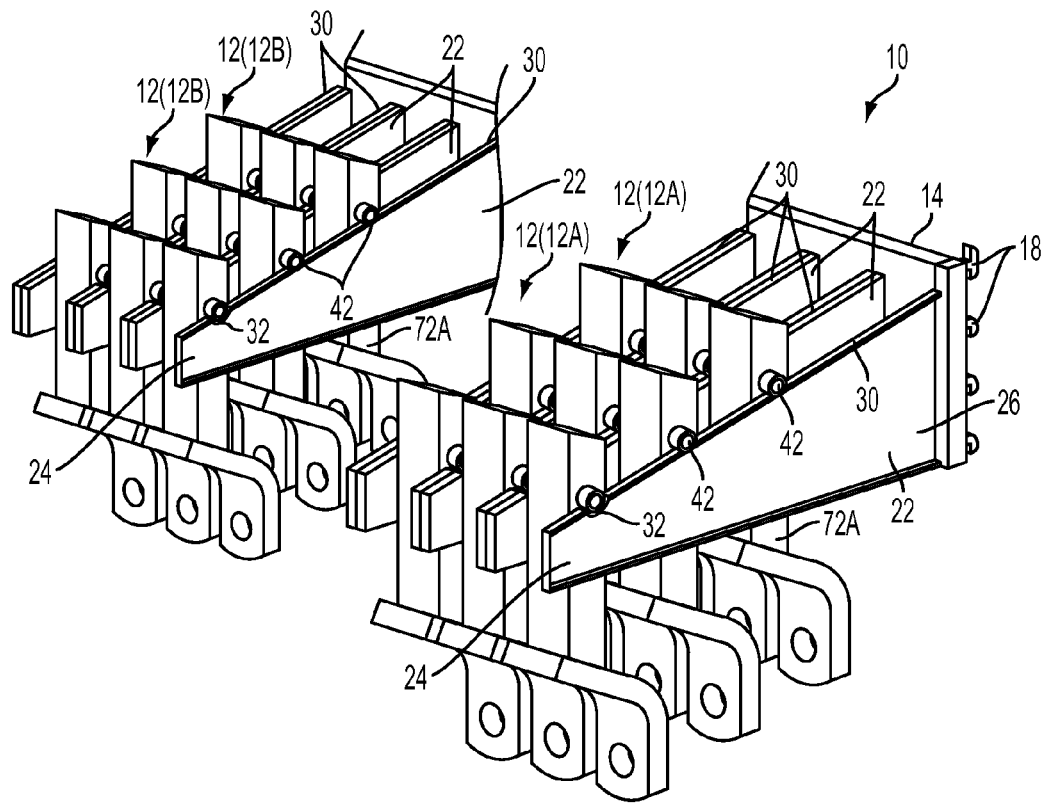
FIG. 1 is a perspective view of an example merchandising display of towing ball mounts, with each ball mount being supported in a vertically hanging position by a respective support member extending through the ball mount in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

One example of a merchandising display 10 that includes a plurality of example towing ball mount merchandising and displaying arrangements 12 is shown in FIG. 1. Within the shown example, only some portion of the merchandising display 10 and thus only some portion of a possible total number of towing ball mount merchandising and displaying arrangements 12 is presented. It is to be appreciated that the specifics of the merchandising display 10 need not be limitations upon the present invention.

The shown example of the merchandising display 10 includes at least one rail 14. The rail 14 provides at least a portion of a frame work for supporting other aspects of the merchandising display 10 in mid-air. The merchandising display 10 can be used to create a user-friendly display for heavy and/or cumber some retail products, and specifically vehicle towing-associated products. As such, the rail 14 should be sufficiently strong to firmly support a cantilevered weight. It is to be understood that the specifics of mounting the rail 14 need not be specific limitations upon the present invention.

The rail 14 may be mounted to a display wall, backing, or the like (not shown). Within the shown example, the rail 14 includes a plurality of attachment tabs 18 for such mounting and that may lock into slots within the display wall, backing, or the like via a known manner. It is to be understood that other means to attach the rail to the wall, backing, or the like can be utilized. It is to be understood that the wall, backing, or the like may be a traditional wall, part of a prefabricated display unit, a wire frame structure, or any other generally vertically surface that is able to provide sufficient support. Also, it is to be appreciated that the wall may be located within a retail store or other venues in which display of product occurs. Such other venues may include trade shows and sample mock up presentations.

A number of support members, which are shown as arms 22, are mounted to the rail 14. The arms 22 can be an integral part of the rail 14, or the arms can be mounted to the rail in a fixed or detachable manner. The arms 22 extend from the rail 14 in a generally horizontal direction and have a proximal end 24 and distal end 26. The arms 22 are intended to have sufficient strength for supporting heavy weights placed thereon via placement of towing products. Within the shown example, each shown arm 22 includes an upper surface 30 that is sloped such that a rear portion of the surface at the distal end 26 adjacent to the rail 14 is at a vertical height greater than the vertical height of the surface at the proximal end 24. The shown example includes at least one detent or recess 32 within the upper surface 30 of each arm 22. The detent or recess 32 is located near the proximal end 24 of the respective arm 22. The recess 32 is for holding a front or proximal arrangement 12 and for preventing the front or proximal arrangement 12 from proceeding forward off of the arm 22 due to the slope of the surface 30. It is to be appreciated that another, different structure (e.g., a projection) could be used for the stop/hold function. The arrangement 12 that follow the front or proximal arrangement 12 can slide forward on the surfaces 30 once the front or proximal arrangement 12 is manually removed, such as by a person selecting the front or proximal arrangement 12.

As mentioned, a plurality of towing ball mount merchandising and displaying arrangements 12 are shown within FIG. 1. At this point, it is worth identifying that two distinct examples of towing ball mount merchandising and displaying arrangements 12A, 12B are shown. However, the towing ball mount merchandising and displaying arrangements 12 may be discussed generically for aspects that are generic to all of the towing ball mount merchandising and displaying arrangements.

Figure 2:
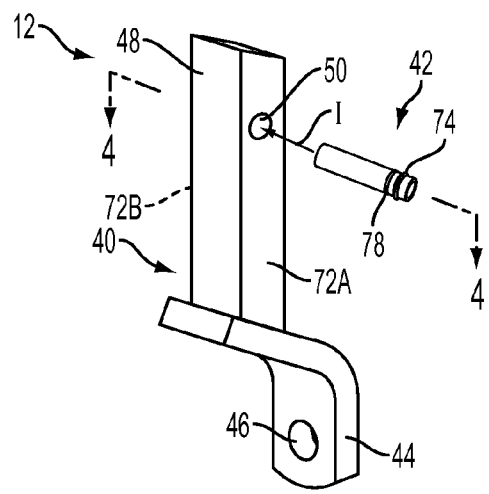
FIG. 2 is perspective view of a single ball mount in the vertical orientation as achieved in FIG. 1 and also shows a single, associated support member oriented for insertion to extend through the ball mount.
Figure 3:
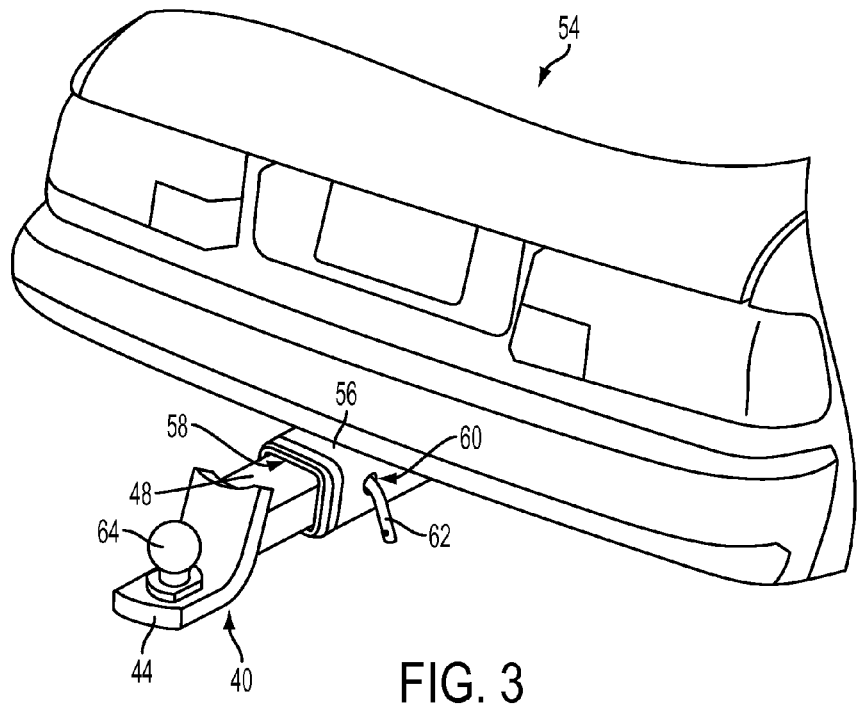
FIG. 3 is perspective view of a portion of a vehicle and a ball mount located thereon, showing the ball mount in a final use environment in a horizontal orientation, which differs from the vertical orientation shown in FIGS. 1 and 2, with the support member used within the merchandising display of FIG. 1 removed from the ball mount.

Turning to FIG. 2, one example towing ball mount merchandising and displaying arrangement 12 is shown in a non-assembled or exploded condition. The arrangement 12 includes an example ball mount 40 and a removable support member 42. Focusing upon the ball mount 40, the ball mount includes a tongue portion 44. The tongue portion 44 has an aperture 46 for receiving a securing portion of a hitch ball (not shown within FIG. 2). The ball mount 40 also includes a mounting portion 48 for insertion into a receiver located upon a vehicle (not shown within FIG. 2). The mounting portion 48 has an aperture 50 there through for receiving a securing member (not shown within FIG. 2) to retain the mounting portion within the receiver located upon the vehicle. As can be appreciated, the ball mount 40 shown within FIG. 3 is in a vertical orientation. This vertical orientation is the orientation that the ball mount 40 achieves when the support member 42 is utilized with the ball mount within the towing ball mount merchandising and displaying arrangement 12 within the merchandising display 10 as shown in FIG. 1. However, for the purpose of understanding the ultimate function of the ball mount 40, attention is directed to FIG. 3. Within FIG. 3, a vehicle 54, such as an automobile, has a receiver 56 mounted thereon. The receiver 56 has an aperture 58 into which the mounting portion 48 of the ball mount 40 can extend. In the shown example, the ball mount 40 is positioned such that the mounting portion 48 is inserted into the receiver 56 located upon the vehicle 54. The receiver 56 includes an aperture 60 that extends through the receiver. The aperture 50 (not visible in FIG. 3, see FIG. 2) extending through the mounting portion 48 of the ball mount 40 can be aligned with the aperture 60 through the receiver 56. A securing member 62 can extend through the aligned apertures 50, 60 for retaining the mounting portion 48 of the ball mount 40 within the receiver 56 that is located upon the vehicle 54. The securing member 62 can be referred to as a pin and may have portions to provide for fixing or locking the securing member in a position extending through the apertures 50, 60 on the mounting portion 48 of the ball mount 40 and the receiver 56. Also as shown within the example of FIG. 3, a hitch ball 64 is positioned onto the tongue portion 44 of the ball mount 40 such that a securing portion, such as a threaded shaft, (not visible) of the hitch ball extends through the aperture 46 (not visible in FIG. 3, see FIG. 2) of the tongue portion 44 of the ball mount 40. The hitch ball 64 can be secured onto the tongue portion 44 of the ball mount 40 via the use of a separate securing member, such as a nut that threadingly engages with a threaded portion that provides the securing portion (not visible in FIG. 3). As can be appreciated upon viewing FIG. 3, the orientation of the ball mount 40 in its final use environment as being secured into the receiver 56 located upon the vehicle 54 is a horizontal orientation.

Turning back to FIG. 2, it is to be appreciated that the orientation of the ball mount 40 shown within FIG. 2 is different from the orientation shown in FIG. 3. Specifically, the orientation shown within FIG. 2 is a vertical orientation. This vertical orientation is the orientation that the ball mount 40 achieves when utilized with the removable support member 42 and placed within the merchandising display 10 as shown in FIG. 1. It is to be appreciated that, if the support member 42 extending through the aperture 50 of the ball mount 40 is considered to be a pivot location, a bulk of weight of the ball mount 40 is toward the end portion of the ball mount that includes the tongue portion 44. As such, the end portion of the ball mount that includes the tongue portion 44 has a propensity to hang vertically downward due to gravity.

Focusing on the removable support member 42, the support member extends through the aperture 50 of the mounting portion 48 of the ball mount 40 when the towing ball mount merchandising and displaying arrangements 12 is assembled. FIG. 2 includes an arrowhead "I" that shows an insertion movement direction for insertion of the removable support member 42 into the aperture 50. It should be noted that in one specific example, insertion may be done from the other side. It is to be recalled that the aperture 50 through the mounting portion 48 of the ball mount 40 is the same aperture through which the securing member 62 (See FIG. 3) extends when the ball mount 40 is utilized within its final use environment within the receiver 56 located upon the vehicle 54 (see FIG. 3).

As can be appreciated upon reviewing FIG. 1, in order for the towing ball mount merchandising and displaying arrangements 12 supported upon the arms 22, the support members 42 extend to engage the upper surfaces 30 of the arms. Each support member 42 has portions 70 that extend to protrude from each of two sides 72A, 72B (see briefly FIG. 2) of the mounting portion 48 of the ball mount 40. It should be appreciated that within FIG. 1, only one of the two portions 70 are visible for each towing ball mount merchandising and displaying arrangement 12. As such, attention is directed to FIG. 4A in which both of the two portions 70 of the example towing ball mount merchandising and displaying arrangement 12 are shown extending from the two sides 72A, 72B of the mounting portion 48. It is to be appreciated that the mounting portion 48 is shown in phantom for the purpose of allowing ease of viewing structures of the support member 42. Also, it is to be appreciated that the two portions 70, although similar, may be somewhat different. As such, the two portions 70 may be separately identified as 70A, 70B. Of course, the two portions 70A, 70B may be generically referred to by the designation 70.

Returning to FIG. 1, for each towing ball mount merchandising and displaying arrangement 12, the portions 70 of the support member 42 that protrude provide contact areas for engagement with members of a merchandising display 10. In the example of FIG. 1, the engagement is with the upper surfaces 30 of the arms 22. As such, the contact areas on the support member 42 can support the ball mount 40 relative to the arms 22 of the merchandising display 10. Specifically, the ball mount 40 is suspended upon the support member 42 relatively within the merchandising display 10 in a vertical orientation.

In accordance with one specific aspect of the present invention, the support member 42 includes at least one spacer portion 74 that interacts with the mounting portion 48 of the ball mount 40 to retain the support member at a position relative to the ball mount with the portions 70 extending to protrude from each of the two sides 72A, 72B of the mounting portion. In other words, one aspect is to provide for protrusion (e.g., the portions 70) on both sides 72A, 72B such that the support member 42 can engage two arms 22 (see briefly FIG. 1) on each of the two sides of the mounting portion 48, with the ball mount extending vertically (e.g., hanging vertically) with a bulk of the weight hanging downwardly, relative to the two adjacent arms.

It is to be appreciated that the spacer portion 74 is to provide the function of retaining the support member 42 at a position relative to the ball mount with portions 70 extending to protrude from each of two sides 72A, 72B of the mounting portion 48 can be of various constructions and configurations. Within the shown example (see FIGS. 2 and 4A), the spacer portion 74 includes at least on flange that is sized to prohibit entry of the flange into the aperture 50 of the mounting portion 48 of the ball mount 40.

Figure 4A:
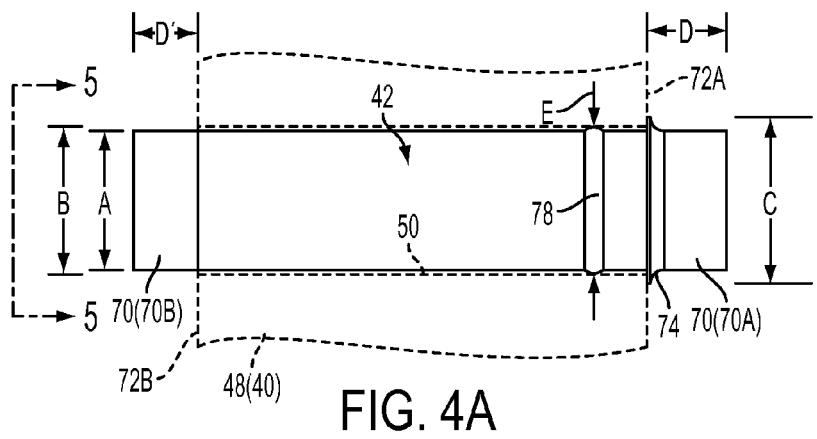
FIG. 4A is an enlarged view of the example support member viewed along line 4-4 in FIG. 2, with a portion of an associated ball mount shown in phantom and partially torn way.

Again attention is specifically directed to FIG. 4A, which is an enlarged view of the support member 42 with the mounting portion 48 of the ball mount 40 shown in phantom as mentioned. As can be clearly seen, the support member 42 extends through the aperture 50 of the mounting portion 48 of the ball mount 40. In combination within FIG. 4A, attention is now also directed to FIG. 5, which is an axial end view taken along line 5-5 in FIG. 4A. In the shown example, a bulk of the support member 42 has a generally cylindrical shape with a circular cross section. The cylindrical shape of the support member 42 extends along a majority of its axial length. Also, within the shown example, the bulk of the support member 42 is hollow. However, the support member 42 need not be hollow.

A diameter distance A of the support member 42 is an outer diameter extending over a majority of the axial length of the support member. The diameter A is slightly smaller than an inner diameter B of the aperture 50 extending through the mounting portion 48 of the ball mount 40. As such, a bulk of the support member 42 can pass relatively freely into and through the aperture 50 of the mounting portion 48 of the ball mount 40.

The spacer flange 74 is located proximate to one end of the support member 42. Within the shown example the spacer flange 74 is a single, annular flange. Specifically, the spacer flange 74 extends uniformly about the radially outermost periphery of the support member 42. The spacer flange 74 has radially outermost diameter distance C which is significantly greater than the diameter B of the aperture of the mounting portion of the ball mount. As such, the spacer flange 74 is sized to prohibit entry of the flange into the aperture 50 of the mounting portion 48. It is to be appreciated that the spacer flange 74 is located at a distance D from an end of the support member 42. As such, that end of the support member 42 is spaced a distance of approximately 0 from the side 72A of the mounting portion 48 of the ball mount 40. This provides one portion 70A or contact area for engagement of that portion of the support member 42 with one arm 22 on the merchandising display 10.

The support member 42 as an overall axial length such that with the spacer flange 74 in engagement with the one side 72A of the mounting portion 48 of the ball mount 40, the other portion 70B of the support member extends beyond the opposite side 72B of the mounting portion. The extent of the protruding portion 70B is at a distance D'. D' may be generally equivalent to the distance D. However, it is not necessary that the dimensions D and D' be equal. The protrusion of the support member 42 for the distance D' provides the other contact area for engagement with the corollary arm 22 of the merchandising display 10 such that the towing ball mount merchandising and displaying arrangement 12, and specifically the ball mount 40 thereof, is supported (e.g., suspended) within the merchandising display 10 upon the support member 42 (see briefly FIG. 1).

Figure 5:
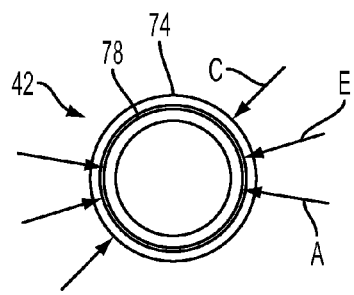
FIG. 5 is an end view of the example support member taken along line 5-5 in FIG. 4A, but with the phantom-shown ball mount removed.

In accordance with another specific aspect of the present invention, the support member 42 includes at least one holder portion 78 that interacts with the mounting portion 48 of the ball mount 40 to resist removal of the support member 42 from its removable (i.e., non-permanent inserted state) cooperation with the ball mount 40. It should again be noted that the support member 42, although quite useful within the display environment of the merchandising display 10 (see FIG. 1) the ball mount 40 has the ultimate use that does not include the support member 42 (see FIG. 3). As such, the support member 42 must be ultimately removable. However, there is also a benefit to prevent unintended, premature, or the like removal of the support member 42 from the aperture 50 of the ball mount 40. For example, it is beneficial to avoid removal of the support member 42 while the support member is supporting the ball mount 40 with in the merchandising display 10. As such, the holder portion 78 interacting with the mounting portion 48 of the ball mount 40 provides the resistance to removal of the support member from the ball mount. It is to be appreciated further that the holder portion 78 that interacts with the ball mount 40 to provide the function of resisting removal can have various constructions and configurations. The example shown within FIGS. 2, 4A and 5 is only a single example.

Turning to the specifics of the shown example holder portion 78, the holder portion include at least one annularly-extending flange 78 that is sized to friction-fit into the aperture 50 of the mounting portion. In the shown example, the flange 78 is a single annular flange. It is to be appreciated that more than one flange could be provided.

The holder portion flange 78 that provides the holder portion has an outer diameter distance E that is slightly larger than the inner diameter B of the aperture 50 mounting portion 48 of the ball mount 40. See FIG. 5 for another view showing the diameter distances A, C and E on the support member 42.

It is to be appreciated that the shown example mounting portion 48 of the ball mount 40 (see FIGS. 2 and 4A) is of solid (i.e., non-hollow) construction. Also, it is to be appreciated that the holder portion flange 78 is spaced at an axially distance along the support member 42 such that the holder portion flange is within the interior of the aperture 50 when the spacer flange 74 is in engagement with the side 72A of the mounting portion 48. As such, when the support member 42 is inserted into the mounting portion 48 of the ball mount 40 as indicated by the arrowhead "I" within FIG. 2, the holder flange enters into the aperture 50 in a friction fit engagement with the surface that defines the aperture 50. Also, it is to be appreciated that some amount of plastic/elastic deformation of the holder portion flange 78 may occur. The ultimate result is that the holder portion flange 78 provides a resistance to removal of the support member 42 from the aperture 50 on the mounting portion 48 on the ball mount 40. Of course, it is to be appreciated that since the support member 42 is removable, the friction engagement between the holder portion flange 78 of the support member 42 and the inner surface of the aperture 50 of the mounting portion 48 can be overcome such that the support member can be moved outward from the mounting portion (i.e., in the direction opposite to that shown by the arrowhead "I" of FIG. 2).

Figure 4B:
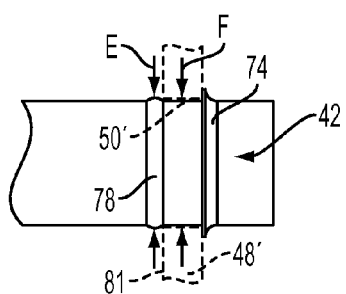
FIG. 4B is a partially torn-off view that is similar to FIG. 4A, but shows the same support member with another example ball mount shown in phantom and partially torn way.

Turing briefly to the mounting portion 48 on the ball mount 40, as mentioned the mounting portion 48 on the ball mount 40 can be varied. Also, as mentioned, the mounting portion 48 on the ball mount 40 may be solid (as shown within the example) or may be hollow (e.g., via manufacture using formed sheet or tubing). FIG. 4B is a partially torn-away view of an embodiment of the mounting portion 48' that is hollow.

As mentioned, if the mounting portion 48 is solid (other than the aperture 50, as indicated in FIG. 4A), the holder portion flange 78 can have a friction fit engagement with the surface within the aperture 50. However, if the mounting portion 48' (see FIG. 4B) on the ball mount 40 is hollow, the holder portion flange 78 may be sized and located on the support member 42 so as to interact within an inner surface 81 that bounds the hollow interior and/or inner edge of the inner surface 81 at the aperture 50 within the interior of the hollow mounting portion 48'. Note that the aperture 50' has an inner diameter distance F, which is less than the diameter distance E of the holder portion flange 78. During insertion of the support member 42 into the aperture 50' the holder portion flange 78 snaps through the wall (e.g., tube) thickness of the mounting portion 48. The snapping may include some elastic deformation. It is to be appreciated that the holder portion flange 78 may be located axially along the support member 42 at a distance from the spacer flange 74 sufficient to entrap the wall (e.g., tube) thickness of the mounting portion 48 there between. During removal of the support member 42 from the mounting portion 48' the holder portion flange 78 can snap back out through the aperture 50'.

Focusing again back on the ball mounts 40 of the arrangements 12 (FIG. 1), it is to be appreciated that each ball mount (e.g., of arrangement 12A) and associated receiver 56 (see briefly FIG. 3) have complimentary sizes, but those complimentary sizes may be varied. For example, some common, known sizes for the opening 58 of the receiver 56 (the opening to receiver the mounting portion 48 of the ball mount 40), may be sized at one and one quarter inch by one and one quarter inch (1¼×1¼), two by two inch (2×2), or two and one half inch by two and one half inch (2½×2½). Logically, the ball mount 40 associated with each of the different sizes will have a different size mounting portion 48 as a compliment to the aperture 58 within the associated receiver 56 on the vehicle 54.

Turning back to FIG. 1, the two shown groups of ball mount merchandising and displaying arrangement 12A. 12B within FIG. 1 present two different example sizes of ball mounts 40 (e.g., two of three mentioned examples 1¼×1¼, 2×2, or 2½×2½). Of course, the specific sizes of the ball mounts 40 that are within the ball mount merchandising and displaying arrangements 12A, 12B that are within the display 10 are not important aspects. It is sufficient to appreciate that different sizes of ball mounts 40 can be present within the display 10.

It is to be appreciated that each ball mount 40 within the respective ball mount merchandising and displaying arrangement 12 has an associated removable support member 42. Also, it is to be appreciated that the arms 22 of the display 10 may be positioned (e.g., relatively spaced from each other) to accommodate the dimensions associated with the different sized ball mounts 40.

Figure 6:
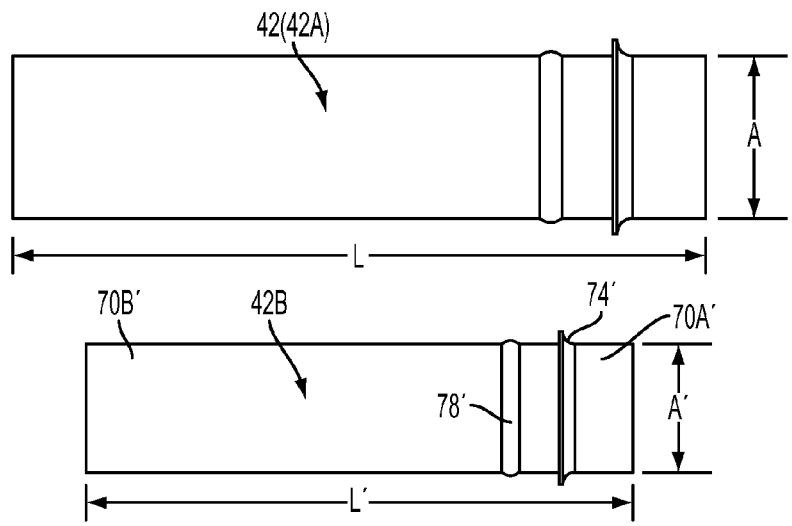
FIG. 6 is a side view of two embodiments of the support member, with the two embodiments being for different size ball mounts, as for example two different size ball mounts shown within FIG. 1 and in accordance with an aspect of the present invention.

Turning to the aspect of each ball mount 40 having an associated support member 42 of appropriate size, attention is directed to FIG. 6. Within FIG. 6, the example support member 42, which is shown within FIGS. 2, 4A and 5, is also shown within FIG. 6 and has an added designation of 42A. As can be appreciated, a diameter A, which was sized to be appropriate for the inner diameter B of the associated mounting portion 48 of the ball mount 40, is indicated. Also, an overall length L of the support member 42A is indicated. This overall length L is sized such that the portions 70 (i.e., contact areas) on the two sides 72A, 72B of the mounting portion 48 of the ball mount 40, with dimensions D and D', are provided (refer to FIGS. 2 and 4A). As can be appreciated, the length L (FIG. 6) is selected based upon the dimensions of the mounting portion 48 of the associated ball mount 40, and also possibly based upon dimensions on the upper surfaces 30 on the arms 22 or other desired input parameters. However, as mentioned since ball mounts of differing sizes (e.g., including a smaller size) may be displayed, FIG. 6 shows another embodiment of the support member 42B, which is of generally smaller size as compared to the first example of support member 42A. As such, the dimension A' of the second example is smaller than the dimension A and the dimension L' is smaller than the dimension L.

As can be appreciated, the dimension A' is such that the support member 42B may suitably interact with the inner diameter of the associated ball mount of complementary size. Suitable portions 70A', 70B' (e.g., contact areas) located on each of the two sides of the associated mounting portion of the ball mount are provided such that the contact areas can engage with members (e.g., the arms) of the merchandising display 10 such that the associated ball mount is supported (e.g., suspended) and the associated ball mount is supported in the vertical orientation as shown in FIG. 1. Also, the spacer flange 74 and the holder portion flange 78' can be suitably sized for engagement and retention of the support member 42B relative to the associated, smaller ball mount.

Figure 7:
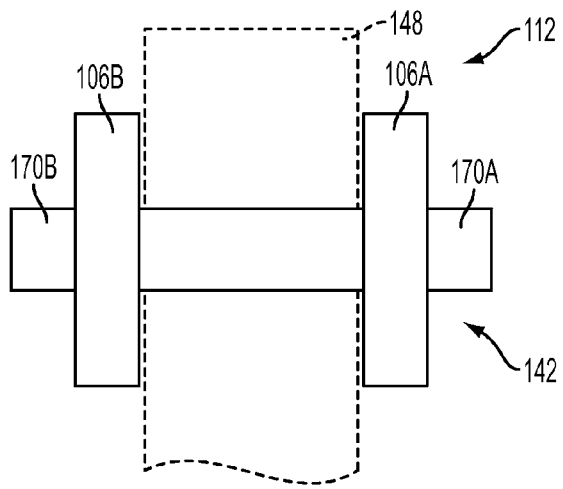
FIG. 7 is a side view of another example ball mount support, with a portion of an associated ball mount shown in phantom, which may provide for displaying of a relatively smaller sized ball mount at a location dimensioned for display of a relatively larger sized ball mount and in accordance with an aspect of the present invention.
Figure 8:
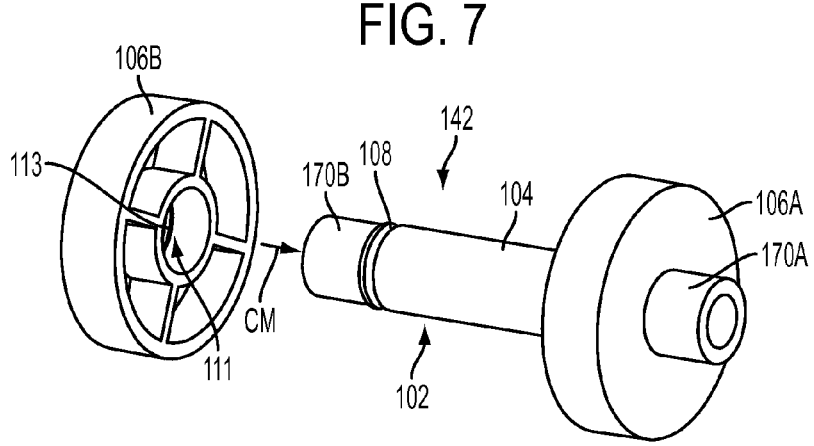
FIG. 8 is an exploded, perspective view of the ball mount support of FIG. 7.

As mentioned, the second, smaller example presented in FIG. 6 is used for a smaller ball mount. Also, it was mentioned that the support members (e.g., arms 22) of the merchandising display 10 could also be suitably of smaller spacing dimension. Such is shown within the example of FIG. 1. However, it is certainly possible to provide support members (e.g., arms) 22 for use with a relatively smaller ball mount, but without use or need of the support members (e.g., arms) 22 of the merchandising display 10 to have a relatively smaller spacing dimension than the spacing dimension utilized for the relatively larger ball mounts. FIGS. 7-8 provide one example of a support member 142 that permits use with a mounting portion 148 of a ball mount within a ball mount merchandising and displaying arrangement 112 that can be supported on members (e.g., arms) 22 of the merchandising display 10 that are spaced apart at a dimension utilized (e.g. for suspension) for an otherwise larger ball mount support. It is to be appreciated that such a support member 142 can have a variety of constructions and configurations and that the example shown in FIGS. 7-8 is only one example.

The shown example support member 142 is a two part support member. A first part 102 of the support member 142 includes a rounded exterior, cylindrical shaft 104. The shaft 104 has an elongate, axial length that is similar to the overall length L of the overall support member 42A shown in FIG. 6, but also has a diameter similar to diameter A of the overall support member 42B. The first member 102 has a first side spool or flange 106A integrally molded with the elongate shaft 104. A segment 170A of the elongate shaft 104 extends from a first side of the spool 106A to provide a contact area for engagement with the member (e.g. arm) 22 of the merchandising display 10. With the first spool being fixed, the contact area is fixed and remains constant. Located at an opposed end of the elongate shaft 104, the elongate shaft has an annular detent 108. A segment 170B of the elongate shaft 104 is located at the distal end of the elongate shaft (e.g., beyond the detent 108). It is to be appreciated that this portion 170B is a second contact area for engagement with the member (e.g., arm) 22 of the merchandising display 10. Also, although it is not required, the diametrical dimension of this portion 170B may be slightly less than the dimension of the bulk of the elongate shaft 104.

The second part of the support member 142 is a removable, second spool 106B. The second spool 106B has an inner aperture 111 into which the distal end of the elongate shaft 104 can extend. Located within the aperture 111 of the second spool 106B is a radially inwardly directed annular protrusion 113. The annular protrusion 113 has a profile that is generally a congruent compliment to the annular detent 108 located on the shaft 104. As such, the annular protrusion 113 can engage into the detent 108 in a snap fit arrangement such that the second spool 106B is retained onto the first part 102 of the support member 142 once the elongate shaft 104 is passed into and through the second spool 106B such that the portion 170B (i.e., contact area) for engagement with the member (e.g., arm) 22 of the display 10 extends beyond the second spool. See the arrowhead "CM" within FIG. 8 that shows the connection motion of the second spool 106B onto the first part 102. As shown within FIG. 7 the two spools 106A, 106B entrap the mounting portion 148 of the ball mount there between when the mounting portion 148 is upon the shaft 104 when the second spool 106B is connected onto the first part 102. As such the second spool 106B is removably attachable to the shaft 104.

Although this embodiment is not shown within the example merchandising display 10 of FIG. 1, it is to be appreciated that with the two portions 170A, 170B (e.g., contact areas) in engagement with the members (e.g., arms) 22 of the merchandising display 10, the associated ball mount of this particular arrangement 112 will again extend to be supported (e.g., suspended) vertically relative to the display. The two spools 106A, 106B will simply lie next to the arms 22, between the arms and the mounting portion of the ball mount. The portions 170A, 170B that extend to protrude from each of two sides of the mounting portion 148 are located outboard of the first and second spools 106A, 106B. The portions 170A, 170 B that extend to protrude from each of two sides of the mounting portion and are located outboard of the first and second spools 106A, 106B allow use for engagement with members (i.e., arms 22) of a merchandising display 10 spaced for use with a relatively larger sized ball mount.

Figure 9:
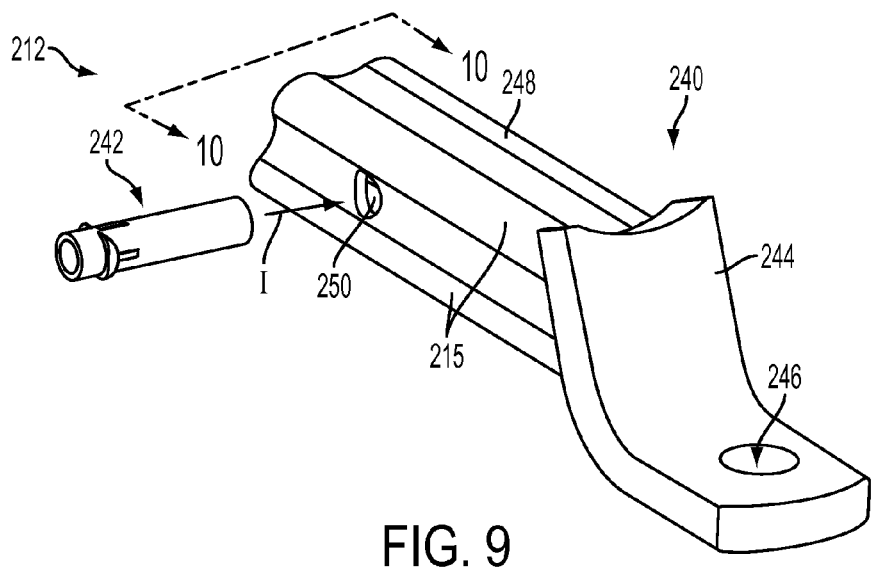
FIG. 9 is a perspective view of another type of ball mount in a vertical orientation and an associated ball mount support in accordance with an aspect of the present invention.
Figure 10:
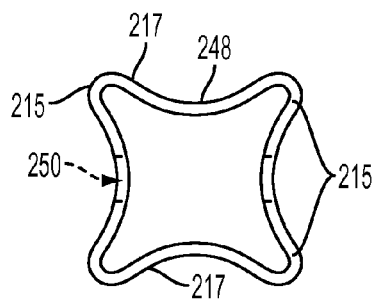
FIG. 10 is a view along line 10-10 in FIG. 9 showing the profile of a portion of the ball mount through which the ball mount support extends.

It is to be appreciated that the mounting portion 48 of the ball mount 40 presented within the previous examples has been somewhat generically presented. Although, it can be appreciated that one example mounting portion 48 has a generally square cross sectional area and four generally flat surfaces sides (72A, 72B providing two of such four side) that may provide a square cross-section. However, it is to be further appreciated that the ball mount 40 may have a mounting portion 48 that differs from such a square cross-section. For example, FIG. 9 shows a towing ball mount merchandising displaying arrangement 212, with a ball mount 240 and a removable support member 242, but with a mounting portion 248 that does not have a square cross-section. Specifically, the mounting portion 248 has a plurality of lobes 215 when viewed in cross section. See FIG. 10. Such a mounting portion 248 of the ball mount 240 may be advantageously constructed via using sheet material that is formed to provide the lobes 215. The interior of the mounting portion 248 may be hollow. Such hollowness may provide weight and/or cost savings. This may be different than the construction of the previously mentioned square cross-section mounting portion 48, which may have a solid material throughout. It should be noted that the tongue portion 244, and associated aperture 246, may or may not differ from previously presented corresponding structures/configurations.

Focusing upon the example mounting portion 248 that has a plurality of lobes 215, the lobes have curved surfaces 217. As such, some of the example support members (e.g., 42) previously described may not provide for an optimal engagement with the mounting portion 248 of the "lobed" ball mount 240. However, it is to be appreciated that the present invention includes the aspect of the support member 242 being configured to optimally interact with the mounting portion 248 of the ball mount 240, even if the mounting portion has some differing construction or configuration (e.g., lobed).

Figure 11:
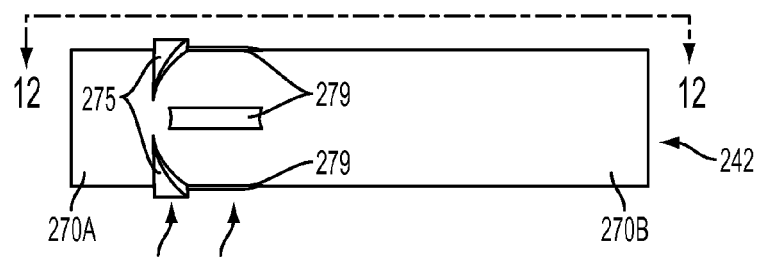
FIG. 11 is a side view of the ball mount support of FIG. 9.
Figure 12:
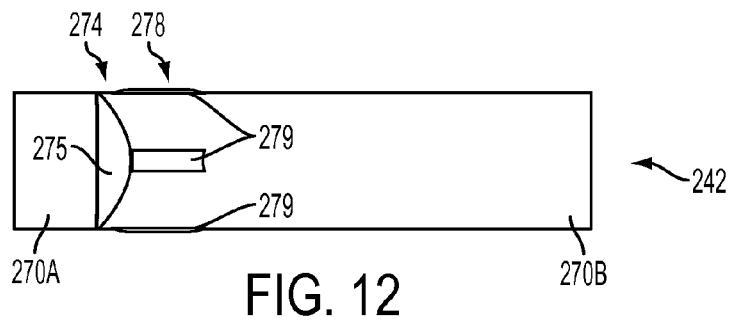
FIG. 12 is a view along line 12-12 in FIG. 11.

The support member 242 shown within FIG. 9 has such ability. The support member 242 is similar to the previously described support members (e.g., 42) in that the support member 242 has an elongate extent for extending through an associated aperture 250 of the mounting portion 248 of the ball mount 240. Also, the support member 242 has portions 270A, 270B (FIGS. 11 and 12) that extend to protrude from each of the two sides of the mounting portion 248. The protruding portions 270A, 270B of the support member 242 provide contact areas for engagement with members (e.g., arms) 22 of a merchandising display 10 such that the ball mount 240 is supported (e.g., suspended) within the merchandising display 10 upon the support member 242. Although this embodiment of the towing ball mount merchandising displaying arrangement 212 is not shown within the example merchandising display 10 of FIG. 1, it is to be appreciated that the towing ball mount merchandising displaying arrangement 212 will hang vertically similar to the previously described examples.

A spacer portion 274, that interacts with the mounting portion 248 of the ball mount 240 to retain the support member 242 at a position relative to the ball mount with the portions 270A, 270B extending to protrude from each of the two sides of the mounting portion are modified as compared to the previous examples to accommodate the lobes 215 of the mounting portion. Specifically, attention is directed to the enlarged view of FIGS. 11-12. The spacer portion 274 is provided as a series of plural flanges or flange segments 275 that each extends only partially about the outer periphery of the support member 242. The flange segments 275 can thus be considered to be partially annular flanges. Also, the flange segments 275 is curved or tapered to congruently mate into the curvature (i.e., curved contour of the surfaces 217) of lobes 215 of the mounting portion 248 of the ball mount 240. Within the shown example, two flange segments 275 are provided and are located on diametrical opposed sides of the support member 242. It is to be appreciated that although within the example, the flange segments 275 are discontinuous from each other, it is certainly possibly that the flange segments maybe continuous with at least some small amount of material extending between the bulk of the flange segments. Again, similar to the previous examples concerning the spacing of the flange, the flange segments 275 of the present example are sized to prohibit entry of the flange segments into the aperture 250 of the mounting portion 248. However, it is to be appreciated that the spacer portion 274, as composed by the flange segments 275, can nest into the lobes 215 of the outer surface of the mounting portion of the ball mount 240. As such, the flange segments 275 have curved contours that mate within the curved surfaces of at least some of the lobes 215 of the mounting portion 128 of the ball mount 240.

Also, similar to the previous examples, the present example support member 242 includes at least one holder portion 278 that interacts with the mounting portion 248 of the ball mount 240 to resist removal of the support member 242 from the ball mount. However, the present example holder portion 278 differs from the previous examples. Specifically, the holder portion 278 of the current example includes a plurality of flange segments 279 that are located on the outer periphery of the support member 242 and are spaced apart from each other about the outer periphery. The flange segments 279 are raised segments such that the effective diameter at each of the raised segments 279 is both greater than the diameter of the bulk of the support member 242 and also slightly greater than an inter diameter of the aperture 250 through the mounting portion 248 of the ball mount 240. As such, the raised segments 279 frictionally engage against the mounting portion 248 of the ball mount within the aperture 250 when the support member is inserted therein (see arrowhead "I" within FIG. 9). It is to be understood that at least some elastic plastic deformation of the raised segments 279 may occur. It should be noted that in one specific example, insertion may be done from the other side.

It is to be noted that the materials of the presented examples need not be specific limitations upon the present invention. One example material for the ball mounts may be metal, but other materials or combinations of materials could be used. One example material for the support members may be plastic, but other materials or combinations of materials could be used.

Also, it is to be appreciated that one aspect of the invention is a ball mount merchandising and displaying arrangement (e.g., 12, 112, and 212). It is also to be appreciated that another aspect of the present invention is one or more of such a ball mount merchandising and displaying arrangement in a merchandising display 10.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The following is claimed:

1. A towing ball mount merchandising and displaying arrangement, the arrangement including:
    a ball mount including a tongue portion having an aperture for receiving a securing portion of a hitch ball and including a mounting portion for insertion into a receiver located upon a vehicle, the mounting portion having an aperture there through for receiving a securing member to retain the mounting portion within the receiver located upon the vehicle; and
    a removable support member extending through the aperture of the mounting portion of the ball mount, the support member having portions that extend to protrude from each of two sides of the mounting portion, the portions of the support member that protrude provide contact areas for engagement with members of a merchandising display such that the ball mount is suspendable relative to the merchandising display upon the support member;
    wherein the support member includes at least one holder portion interacting with the mounting portion of the ball mount to resist removal of the support member from the ball mount, and the least one holder portion includes at least one flange segment that is sized to friction-fit into the aperture of the mounting portion.

2. The arrangement as set forth in claim 1, wherein the support member includes at least one spacer portion interacting with the mounting portion of the ball mount to retain the support member at a position relative to the ball mount with the portions extending to protrude from each of two sides of the mounting portion.

3. The arrangement as set forth in claim 2, wherein the spacer portion includes at least one flange that is sized to prohibit entry of the flange into the aperture of the mounting portion.

4. The arrangement as set forth in claim 3, wherein the at least one flange is a single, annular flange.

5. The arrangement as set forth in claim 3, wherein the at least one flange is a plurality of partially annular flanges.

6. The arrangement as set forth in claim 5, wherein the mounting portion of the ball mount has a plurality of lobes when viewed in cross-section, with the lobes having curved surfaces, the plurality of partially annular flanges have curved contours mate within the curved surfaces of at least some of the lobes.

7. The arrangement as set forth in claim 1, wherein the at least one flange segment is part of at least one flange that is sized to friction-fit into the aperture of the mounting portion.

8. The arrangement as set forth in claim 7, wherein the at least one flange is a single, annular flange.

9. The arrangement as set forth in claim 7, wherein the at least one flange includes a plurality of raised segments spaced from each other.

10. The arrangement as set forth in claim 1, wherein the mounting portion of the ball mount has a square cross-section.

11. The arrangement as set forth in claim 1, wherein the mounting portion of the ball mount has a plurality of lobes when viewed in cross section.

12. The arrangement as set forth in claim 11, wherein the mounting portion of the ball mount is hollow.

13. The arrangement as set forth in claim 11, wherein the lobes having curved surfaces, the support member includes at least one spacer portion to retain the support member at a position relative to the ball mount with the portions extending to protrude from each of two sides of the mounting portion, and the spacer portion having curved contours interacting with the curved surfaces of at least some of the lobes.

14. A towing ball mount merchandising and displaying arrangement, the arrangement including:
   a ball mount including a tongue portion having an aperture for receiving a securing portion of a hitch ball and including a mounting portion for insertion into a receiver located upon a vehicle, the mounting portion having an aperture there through for receiving a securing member to retain the mounting portion within the receiver located upon the vehicle; and
   a removable support member extending through the aperture of the mounting portion of the ball mount, the support member having portions that extend to protrude from each of two sides of the mounting portion, the portions of the support member that protrude provide contact areas for engagement with members of a merchandising display such that the ball mount is suspendable relative to the merchandising display upon the support member;
   wherein the support member includes two parts, the first part includes an elongate shaft for extending through the aperture of the mounting portion of the ball mount, the first part also including a first spool integrally molded within the shaft, the second part includes a second spool that is removably attachable to the shaft.

15. The arrangement as set forth in claim 14, wherein the ball mount is located between the first and second spools.

16. The arrangement as set forth in claim 15, wherein the portions that extend to protrude from each of two sides of the mounting portion are located outboard of the first and second spools.

17. The arrangement as set forth in claim 16, wherein the portions that extend to protrude from each of two sides of the mounting portion and located outboard of the first and second spools allow use for engagement with members of a merchandising display spaced for use with a relatively larger sized ball mount.

18. A merchandising display including:
   a plurality of support members; and
   a plurality of towing ball mount merchandising and displaying arrangements, each arrangement including:
      a ball mount including a tongue portion having an aperture for receiving a securing portion of a hitch ball and including a mounting portion for insertion into a receiver located upon a vehicle, the mounting portion having an aperture there through for receiving a securing member to retain the mounting portion within the receiver located upon the vehicle; and
      a removable support member extending through the aperture of the mounting portion of the ball mount, the support member having portions that extend to protrude from each of two sides of the mounting portion, the portions of the support member that protrude provide contact areas for engagement with respective support members such that the ball mount is suspended within the merchandising display upon the respective support members.

* * * * *